(12) United States Patent
Miller et al.

(10) Patent No.: US 6,672,461 B2
(45) Date of Patent: Jan. 6, 2004

(54) DEVICE FOR SEPARATING SOLIDS FROM AIR

(75) Inventors: Lawrence J. Miller, Stow, OH (US); Richard K. Liggett, Dennison, OH (US); Robert Prachar, Akron, OH (US)

(73) Assignee: Quickdraft, Inc., Canton, OH (US)

( * ) Notice: Subject to any disclaimer, the term of this patent is extended or adjusted under 35 U.S.C. 154(b) by 0 days.

(21) Appl. No.: 10/033,286

(22) Filed: Dec. 26, 2001

(65) Prior Publication Data

US 2002/0125176 A1 Sep. 12, 2002

Related U.S. Application Data (60) Provisional application No. 60/258,424, filed on Dec. 27, 2000.

(51) Int. Cl.$^7$ .................................................. B04C 3/06
(52) U.S. Cl. ..................... 209/722; 209/143; 209/717; 209/718; 209/21
(58) Field of Search ............................... 209/722, 143, 209/133, 142, 723, 717, 718, 21, 22, 23, 24, 25, 26, 27, 134, 135, 136, 137

(56) References Cited

U.S. PATENT DOCUMENTS

| | | | | | |
|---|---|---|---|---|---|
| 522,700 | A | * | 7/1894 | van Gelder et al. | ........ 209/135 |
| 802,651 | A | * | 10/1905 | Meadon | ......................... 209/22 |
| 928,673 | A | * | 7/1909 | Labrasseur | .................... 55/457 |
| 938,656 | A | * | 11/1909 | Frickey | ........................ 209/22 |
| 1,029,214 | A | * | 6/1912 | Morse | ........................... 55/398 |
| 1,680,243 | A | * | 8/1928 | Becker | ........................ 209/250 |
| 1,856,685 | A | | 5/1932 | Anderson | |
| 2,333,961 | A | * | 11/1943 | Sweeny | ....................... 209/723 |
| 2,991,883 | A | * | 7/1961 | Brown et al. | .................. 209/22 |
| 4,477,339 | A | * | 10/1984 | Whaley et al. | ................ 209/22 |
| 5,294,218 | A | | 3/1994 | Fiorentini et al. | |
| 5,735,403 | A | | 4/1998 | Stiglianese | |

* cited by examiner

Primary Examiner—Donald P. Walsh
Assistant Examiner—Jonathan R Miller
(74) Attorney, Agent, or Firm—Sand & Sebolt (57) ABSTRACT

An air material separator may be used to separate scrap from a conveying air flow while having a relatively low weight and short height so that the separator may be positioned within today's single-story manufacturing or processing facilities. The air material separator of the invention includes a generally cylindrical inlet chamber having a spiral wall that directs the inlet flow circumferentially and downwardly. An outlet chamber is positioned below the inlet chamber and includes a conical, perforated wall that allows the conveying air flow to escape through the perforated wall. The scrap carried by the conveying air flow cannot pass through the perforated wall and moves down and out an outlet at the bottom of the conical wall. The overall height of the device is substantially less than prior art air material separators.

18 Claims, 10 Drawing Sheets

EACH INCREMENT = 20 CFM
5000 CFM
AIR VELOCITY EXITING PERFORATED CONE, FPM

| TEST POINTS | 1 | 2 | 3 | 4 | 5 | 6 | 7 | 8 | 9 | 10 | 11 | 12 |
|---|---|---|---|---|---|---|---|---|---|---|---|---|
| 1 (BOTTOM) | +125 | +84 | 0 | 0 | 0 | -62 | -101 | -112 | +52 | +53 | +129 | +154 |
| 2 | +160 | +120 | 0 | 0 | 0 | -78 | -125 | -104 | +82 | 0 | +148 | +154 |
| 3 | +195 | +125 | 0 | 0 | 0 | -78 | -138 | -140 | +98 | +127 | +185 | +194 |
| 4 | +186 | +140 | -42 | 0 | 0 | -82 | -129 | -168 | +55 | +202 | +230 | +235 |
| 5 | +273 | +183 | -66 | 0 | -44 | -140 | -136 | -152 | +237 | +340 | +330 | +325 |
| 6 | +370 | +240 | +116 | 0 | -69 | -103 | -140 | +67 | +530 | +515 | +545 | +449 |
| 7 | +490 | +366 | +178 | +76 | -55 | -112 | -140 | +162 | +942 | +760 | +615 | +356 |
| 8 (TOP) | +641 | +318 | +265 | +216 | +76 | -43 | -122 | +710 | +1062 | +1065 | +648 | +785 |
| AVG. VEL. | +305 | +197 | +56 | +36 | -12 | -87 | -129 | +33 | +382 | +383 | +350 | +332 |

FIG-8

EACH INCREMENT = 20 CFM
7500 CFM
AIR VELOCITY EXITING PERFORATED CONE, FPM

| TEST POINTS | 1 | 2 | 3 | 4 | 5 | 6 | 7 | 8 | 9 | 10 | 11 | 12 |
|---|---|---|---|---|---|---|---|---|---|---|---|---|
| 1 (BOTTOM) | +157 | +43 | -43 | -44 | -76 | -79 | -124 | -114 | -60 | +42 | +184 | +169 |
| 2 | +263 | +69 | -82 | -98 | -103 | -116 | -145 | -170 | -93 | +53 | +109 | +270 |
| 3 | +323 | +157 | -84 | -103 | -114 | -142 | -152 | -160 | -48 | +189 | +340 | +320 |
| 4 | +376 | +153 | -71 | -96 | -106 | -150 | -150 | -171 | -157 | +430 | +530 | +456 |
| 5 | +438 | +216 | -60 | -109 | -96 | -148 | -100 | -79 | -425 | +688 | +766 | +643 |
| 6 | +436 | +280 | +69 | +66 | -133 | -200 | -176 | +168 | +895 | +915 | +1009 | +843 |
| 7 | +582 | +468 | +245 | +98 | -84 | -176 | -173 | +566 | +1858 | +1606 | +1309 | +1277 |
| 8 (TOP) | +1056 | +687 | +515 | +358 | +155 | -47 | -140 | +1157 | +1850 | +2025 | +1617 | +1490 |
| AVG. VEL. | +454 | +259 | +61 | +9 | -70 | -132 | -145 | +150 | +478 | +744 | +733 | +684 |

FIG-9

EACH INCREMENT = 20 CFM
10,000 CFM
AIR VELOCITY EXITING PERFORATED CONE, FPM

| TEST POINTS | 1 | 2 | 3 | 4 | 5 | 6 | 7 | 8 | 9 | 10 | 11 | 12 |
|---|---|---|---|---|---|---|---|---|---|---|---|---|
| 1 (BOTTOM) | +312 | +158 | -82 | 0 | -62 | -132 | -189 | -178 | -140 | +38 | +160 | +238 |
| 2 | +370 | +211 | -132 | -136 | -167 | -153 | -224 | -253 | -147 | +138 | +371 | +400 |
| 3 | +535 | +360 | -110 | -163 | -170 | -204 | -237 | -320 | -167 | +391 | +527 | +557 |
| 4 | +680 | +546 | -104 | -165 | -154 | -162 | -258 | -345 | -226 | +717 | +821 | +774 |
| 5 | +653 | +628 | -162 | -175 | -186 | -152 | -278 | -273 | +710 | +1074 | +1171 | +1090 |
| 6 | +935 | +734 | +255 | -112 | -66 | -150 | -304 | -227 | +1242 | +1608 | +1501 | +1316 |
| 7 | +959 | +872 | +476 | +226 | -55 | -50 | -264 | +927 | +1842 | +2279 | +1971 | +1615 |
| 8 (TOP) | +1098 | +1160 | +762 | +618 | +402 | +186 | -74 | +1924 | +1495 | +1446 | +1471 | +1789 |
| AVG. VEL. | +693 | +584 | +113 | +12 | -57 | -102 | -228 | +157 | +576 | +961 | +999 | +972 |

DEVICE FOR SEPARATING SOLIDS FROM AIR

CROSS-REFERENCE TO RELATED APPLICATIONS

This application claims priority from U.S. provisional application Ser. No. 60/258,424, filed Dec. 27, 2000; the disclosures of which are incorporated herein by reference.

BACKGROUND OF THE INVENTION

1. Technical Field

The present invention generally relates to devices that separate solids from air and, more particularly, to a device that separates scrap from a transport air flow. Specifically, the invention relates to an air material separator or receiver that has compact dimensions and a low overall weight that allow it to be positioned inside a building instead of on the roof as in the prior art.

2. Background Information

Various systems use a pneumatic conveying system to remove scrap from a processing area and to deliver the scrap to a waste container. In the context of this patent application, the terms scrap, trim, broke, edge trim, waste, and web shall be used interchangeably to reference items that are being transported by an air stream and then separated from the air stream. Each of these pneumatic conveying scrap systems uses an air material separator to separate the scrap from the air stream. The scrap may be paper, plastic, film, finished products, cellulose casings, meat packing casings, packing materials, fiberglass, tissue, fabric, or metal foils. The scrap may be supplied in individual pieces or in continuous lengths.

Prior art air material separators have been located outside or on the roof of a building because their heights typically prevent the device from being located inside the building. The roof location was acceptable in the past because buildings were constructed in a manner to have a roof that could support the weight of the air material separator. Many newly-constructed manufacturing or processing facilities are single story structures having a relatively low, light-weight roof that typically cannot support the weight of an air material separator. The art thus desires an air material separator that can be placed inside buildings having low roofs and roofs that cannot support heavy equipment. Ideally, the air material separator must be light enough to be suspended from the roof joists.

A cyclone is an air material separator used in past separation applications. Cyclones are typically relatively tall so that the cyclonic action inside the cyclone has enough time to force the materials to the outside of the separator before the air flow is turned sharply upward to exit the device. The height of most cyclones prevent them from being used inside building structures. For example, one type of 9,000 CFM cyclone is about 210 inches tall (17½ feet). An existing 14,500 CFM cyclone is about 254 inches tall (over 21 feet). An existing 21,500 CFM cyclone is about 303 inches tall (25 feet tall).

Other types of air material separators known in the art function by slowing the scrap-laden airflow to a velocity slow enough to cause the scrap to fall out of the airflow. These devices may also redirect the flow as it is being slowed to encourage the scrap to fall out of the flow. These types of devices typically use an expansion chamber to slow the velocity of the flow.

BRIEF SUMMARY OF THE INVENTION

The invention provides an air material separator that may be used to separate scrap from a conveying airflow while having a relatively low weight and short height so that the separator may be positioned within today's single-story manufacturing or processing facilities. The air material separator of the invention includes a generally cylindrical inlet chamber having a spiral wall that directs the inlet flow circumferentially and downwardly. An outlet chamber is positioned below the inlet chamber and includes a conical, perforated wall that allows the conveying air flow to escape through the perforated wall. The scrap carried by the conveying air flow cannot pass through the perforated wall and moves down and out an outlet at the bottom of the conical wall. The overall height of the device is substantially less than prior art air material separators.

In one embodiment of the invention, a shroud may be positioned about the conical wall to control the removal of the air flow from the air material separator to contain any expelled particles or dust.

Another objective of the invention is to provide an air material separator wherein the air does not have to be slowed to a low velocity to separate the scrap from the air.

BRIEF DESCRIPTION OF THE SEVERAL VIEWS OF THE DRAWINGS

The preferred embodiment of the invention, illustrative of the best mode in which applicant has contemplated applying the principles of the invention, are set forth in the following description and are shown in the drawings and are particularly and distinctly pointed out and set forth in the appended claims.

Similar numbers refer to similar parts throughout the specification.

DETAILED DESCRIPTION OF THE INVENTION

Figure 1:
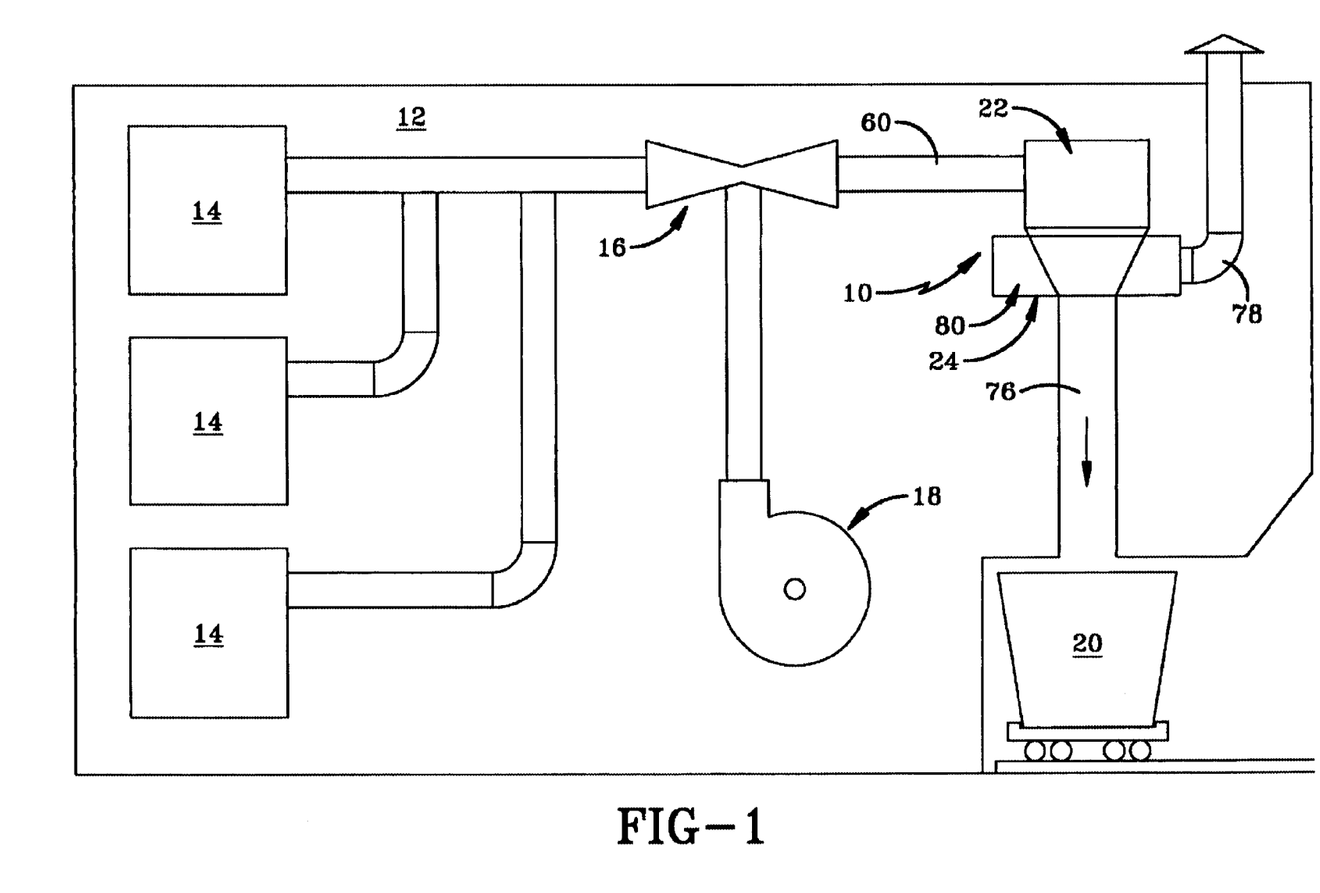
FIG. 1 is a schematic view of a typical system using the air material separator of the present invention.
Figure 2:
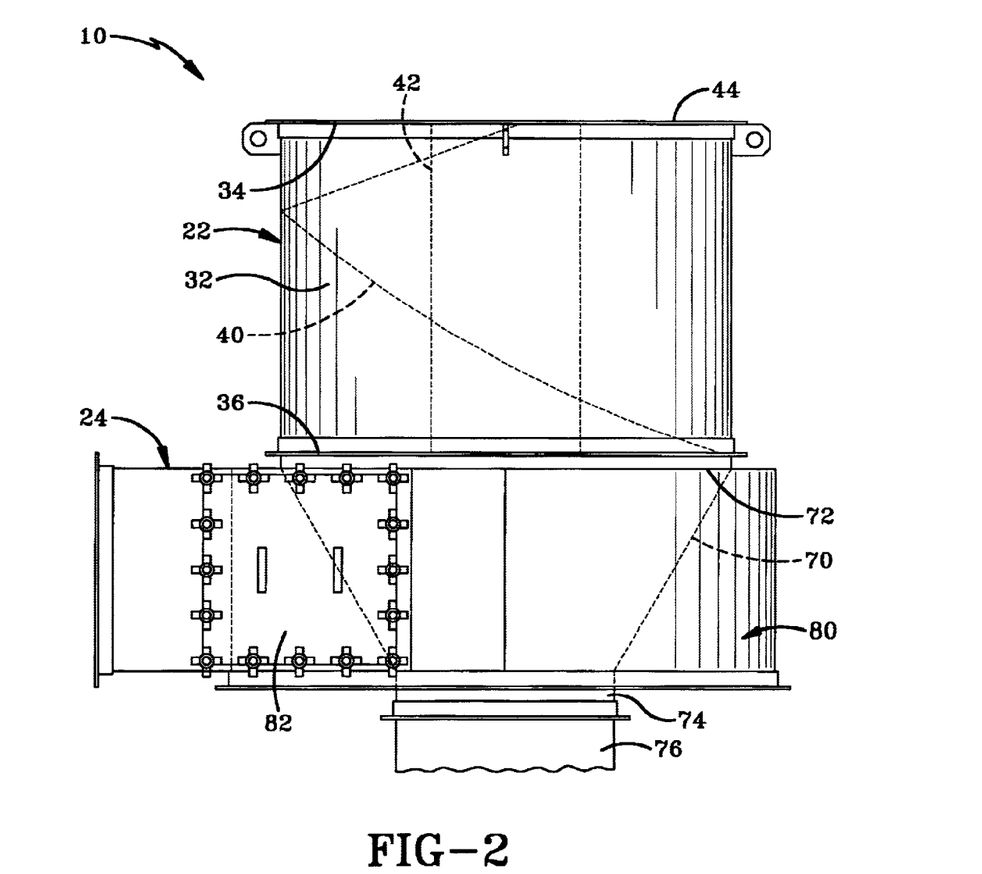
FIG. 2 is a side elevational view of the air material separator with a shroud.
Figure 3:
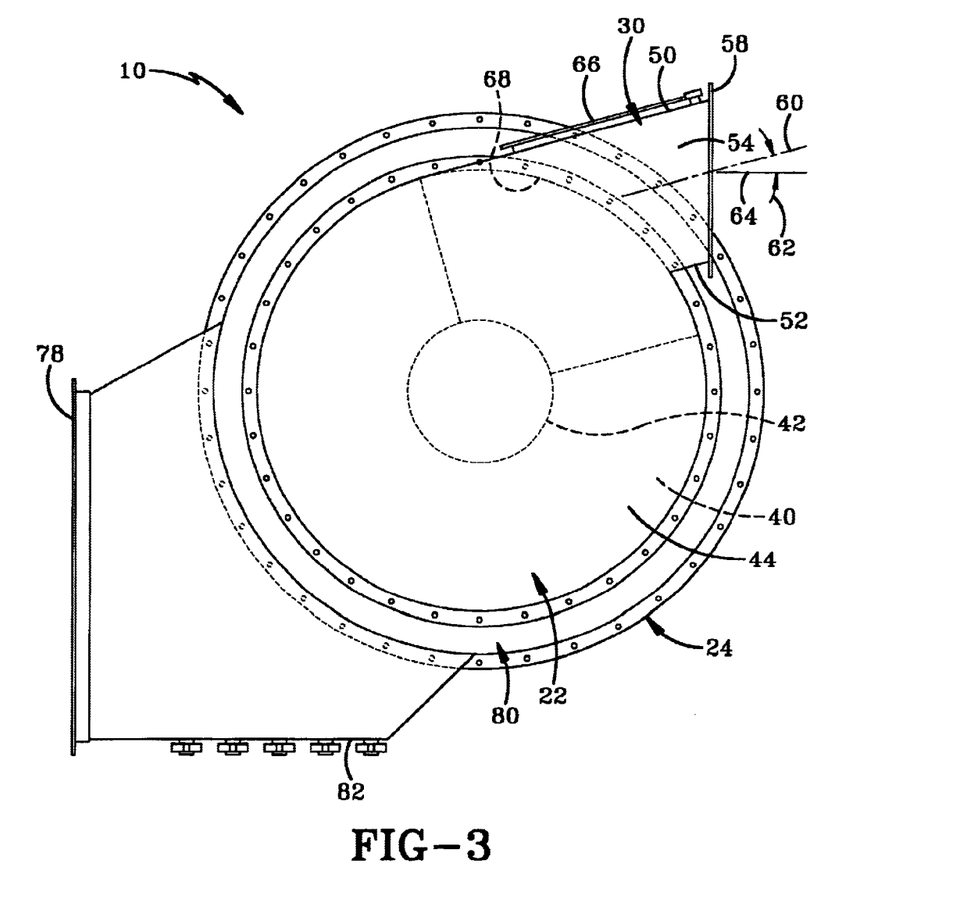
FIG. 3 is a top plan view of the air material separator with a shroud.

The air material separator of the present invention is indicated generally by the numeral 10 in the accompanying drawings. FIG. 1 depicts an exemplary system using air material separator 10. The system is located inside a building 12 having at least one machine 14 that creates scrap to be removed by a conveying air flow. In the system depicted in FIG. 1, three machines 14 are connected to a single air material separator 10 that separates the scrap from the conveying air flow. The conveying air flow is created by connecting a blower 18 to a device that creates a vacuum flow such as a venturi. A device 16 such as a venturi tube creates the conveying air flow for each machine 14 that carries the scrap to air material separator 10. In other embodiments of the invention, the scrap may be pulled or pushed directly through a conveying fan without the need for using a venturi tube. Air material separator 10 slows the conveying air flow, separates the scrap from the flow, and drops the scrap out of the outlet of the material separator 10 into a waste container 20. As shown, waste container 20 may be located outside of building 12. In other embodiments, waste container 20 and air material separator 10 may be located outside of the room that houses machines 14. This location allows machines 14 to be kept as sanitary as possible. Such an arrangement is desired in food scrap processing systems.

Figure 5:
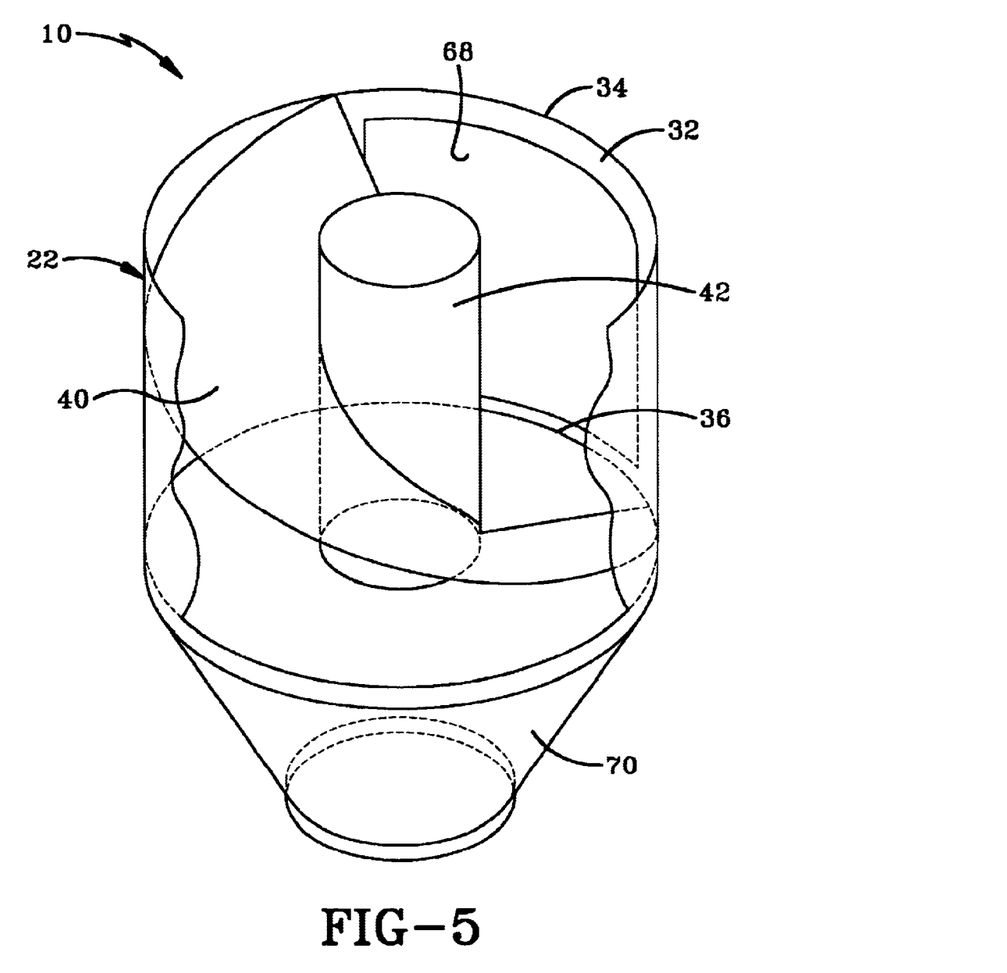
FIG. 5 is a perspective view of the air material separator (without the shroud) with the outer wall broken away so that the spiral top wall may be seen.

Air material separator 10 generally defines an inlet chamber 22 and an outlet chamber 24 that are in fluid communication with each other. Inlet chamber 22 includes an inlet 30 that initially receives the scrap-laden air flow. Inlet 30 is connected to a generally cylindrical outer sidewall 32 having a substantially circular upper edge 34 and a substantially circular lower edge 36. In another embodiment of the invention, upper edge 34 may be oval or elliptical depending on the shape of outer sidewall 32. A spiral wall 40 extends from upper edge 34 of inlet 30 to lower edge 36 in a spiral manner as shown in FIG. 5. An inner sidewall 42 is connected to the inner edge of spiral wall 40. Inner sidewall 42 is also substantially cylindrical in the preferred embodiment of the invention and is disposed substantially concentric with sidewall 32. An inlet flow path is defined between sidewalls 32,42 and spiral wall 40.

The bottom of inlet chamber 22 is open and exposed to outlet chamber 24. A top wall 44 is connected to upper edge 34 and may or may not close off the inner portion of inner sidewall 42. In the embodiment of the invention depicted in the drawings, top wall 44 caps the space inside of inner sidewall 42. In other embodiments, the space inside inner sidewall 42 is in communication with outlet chamber 24. When the end of inner sidewall 42 is not capped off, the opening will provide a visual indication of a scrap jam as pieces of scrap and some conveying air will exhaust through the opening.

Inlet 30 includes an outer sidewall 50, an inner sidewall 52, a top wall 54, and a bottom wall 56. Outer sidewall 50 is preferably tangentially disposed with respect to outer sidewall 32 of inlet chamber 22. Inner sidewall 52 is substantially parallel to outer sidewall 50. Top and bottom walls 54 and 56 are also substantially parallel. Inlet 30 further includes a face frame 58 that connects with the supply line 60 (schematically shown in FIG. 1). Face frame 58 is preferably angled with respect to the longitudinal centerline 60 of inlet 30 as shown by reference angle 62 (line 64 being perpendicular to face plate 58). Angle 62 is preferably 15 degrees but may be disposed at any angle between zero and 45 degrees. The angled orientation of face plate 58 orients the incoming duct at an angle with respect to centerline 60 and forces at least a portion of the scrap-laden airflow to wipe against outer sidewall 50 and outer sidewall 32. In other embodiments of the invention, face plate 58 is perpendicular to centerline 60. An access panel 66 may be provided in outer sidewall 50. An inlet opening 68 provides fluid communication between inlet 30 and inlet chamber 22.

Spiral wall 40 preferably spirals downwardly from upper edge 34 to lower edge 36 over a 270 degree to a 360 degree arc. The arc may also be other lengths without departing from the concepts of the invention. Spiral wall 40 preferably starts extending downwardly immediately downstream of inlet opening 68. Top wall 44 is parallel to top wall 54 of inlet 30 in the area of inlet chamber 22 immediately adjacent opening 68. Spiral wall 40 then starts moving downwardly in a tangential or angled manner. Spiral wall 40 then drops downwardly until it reaches lower edge 36. Wall 40 may drop down at a varying or constant angle. Spiral wall 40 causes the scrap-laden flow to move downwardly as it moves around inlet chamber 22.

The bottom of inlet chamber 22 is entirely open to outlet chamber 24 along the flow path. The scrap-laden airflow may thus drop down out of inlet chamber 22 into outlet chamber 24 at any time after entering inlet chamber 24.

Outlet chamber 24 is defined by a perforated conical wall 70 having an upper edge 72 connected to lower edge 36 of sidewall 32. Conical wall 70 also includes a cylindrical lower portion or edge 74 connected to a scrap outlet 76. Conical wall 70 has an open area of 20 to 90 percent of its area. Wall 70 may be perforated with round, oval, diamond, slotted, square, hexagonal, or other shaped openings. Wall 70 may be fabricated from a variety of rigid materials and may be fabricated by placing a cloth material over a frame. Wall 70 may be angled (angle 84) between zero and 45 degrees from vertical.

Outlet chamber 24 separates the scrap from the conveying airflow without causing any down blast to exit chamber 24 through scrap outlet 76. Conical wall 70 is configured to cause essentially all of the conveying airflow to pass through wall 70 and out of air outlet 78. A shroud 80 surrounds wall 70 to contain the conveying airflow and to direct it to air outlet 78. Shroud 80 thus allows the airflow to be moved outside building 12 as depicted in FIG. 1. An access door 82 may be provided in shroud 80 to allow shroud 80 and the perforated 70 to be cleaned.

Figure 4:
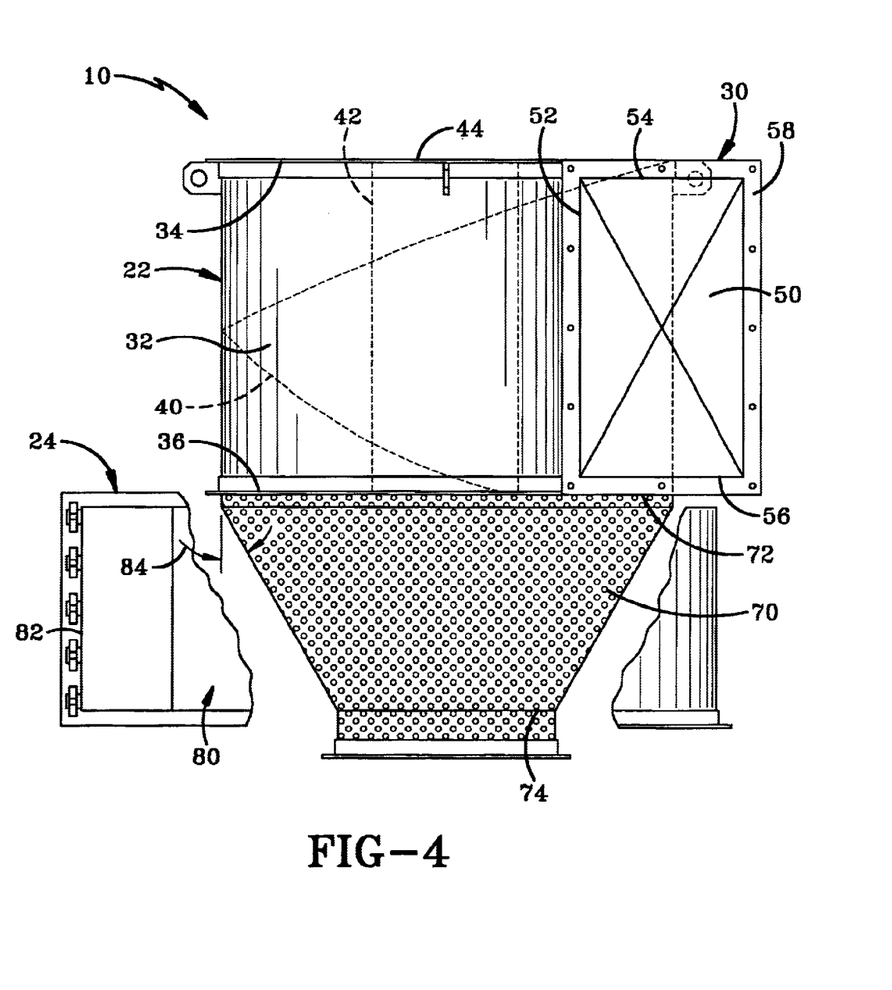
FIG. 4 is a front elevational view of the air material separator with a portion of the shroud broken away to show the perforated cone.

For the purpose of providing an example and to compare air material separator 10 of the present invention to prior art devices, the following exemplary embodiments are provided. A 4,600 CFM air material separator of the present invention weighs approximately 265 pounds and has an overall height of 39.86 inches. The overall diameter of the unit is 36.12 inches. A 9,000 CFM air material separator has an overall height of 53.87 inches. The device weighs 420 pounds and has an overall diameter of 48.12 inches. A 15,000 CFM air material separator weighs 600 pounds and has an overall height of 67.77 inches. The overall diameter is 16.12 inches. In a 22,000 CFM air material separator, the overall height is 81.64 inches with the weight being 810 pounds. The overall diameter is 72.12 inches. In each of these embodiments, conical wall 70 is angled 30 degrees inwardly from vertical as indicated by angle 84 depicted in FIG. 4. The overall heights of these devices are substantially less than prior art devices having similar flow rates. The relatively small overall heights and diameters allow the devices to be installed inside buildings. A relatively low overall weights allow the units to be supported by roof joists.

Figure 6:
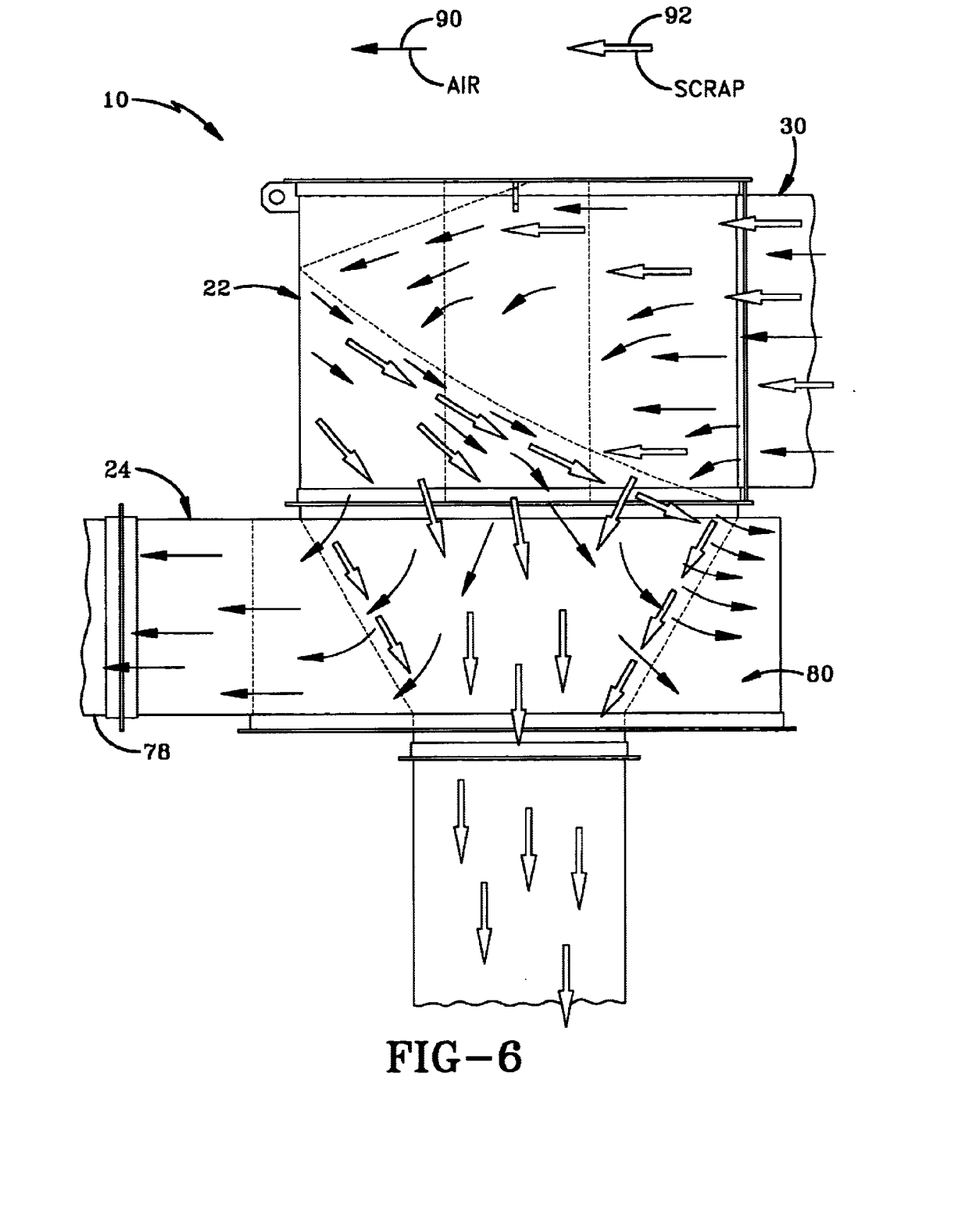
FIG. 6 is a side elevational view of the air material separator with the shroud showing air and scrap moving through the device with the air and scrap being indicated by different arrows.
Figure 7:
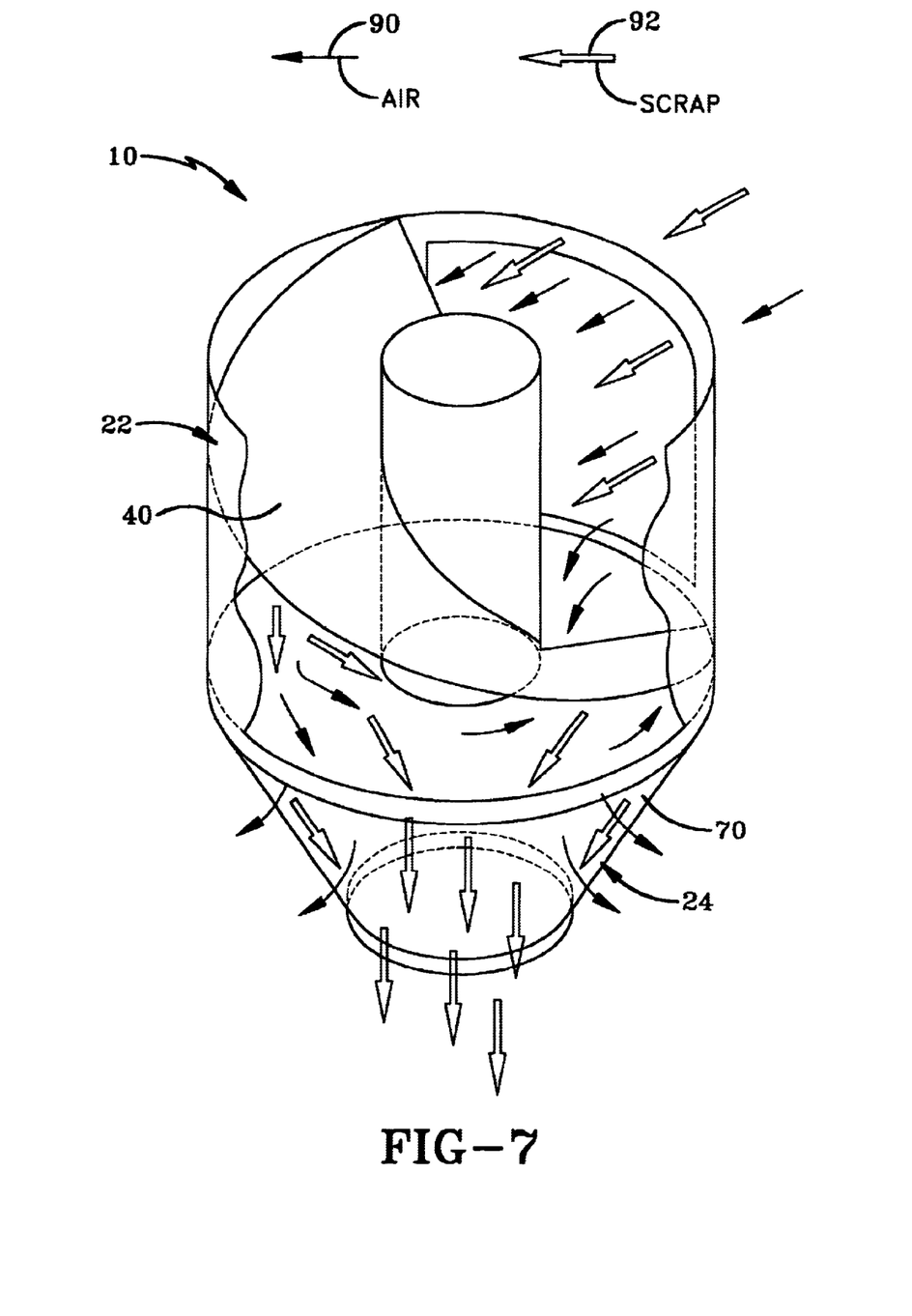
FIG. 7 is a view similar to FIG. 5 showing air and scrap moving through the device with the air and scrap being represented by different arrows.
Figure 8:
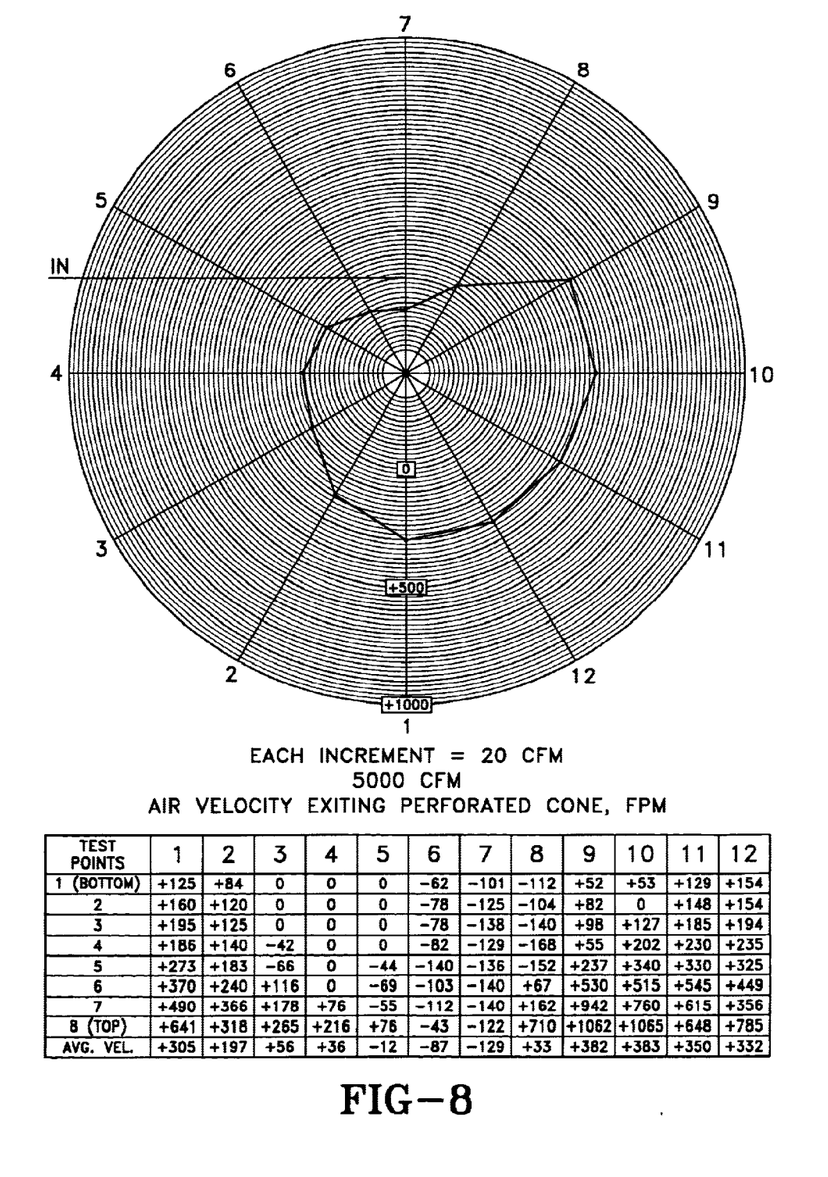
FIG. 8 is a graph showing the velocity of air exiting the outlet chamber at various points about a 5000 CFM air material separator.
Figure 9:
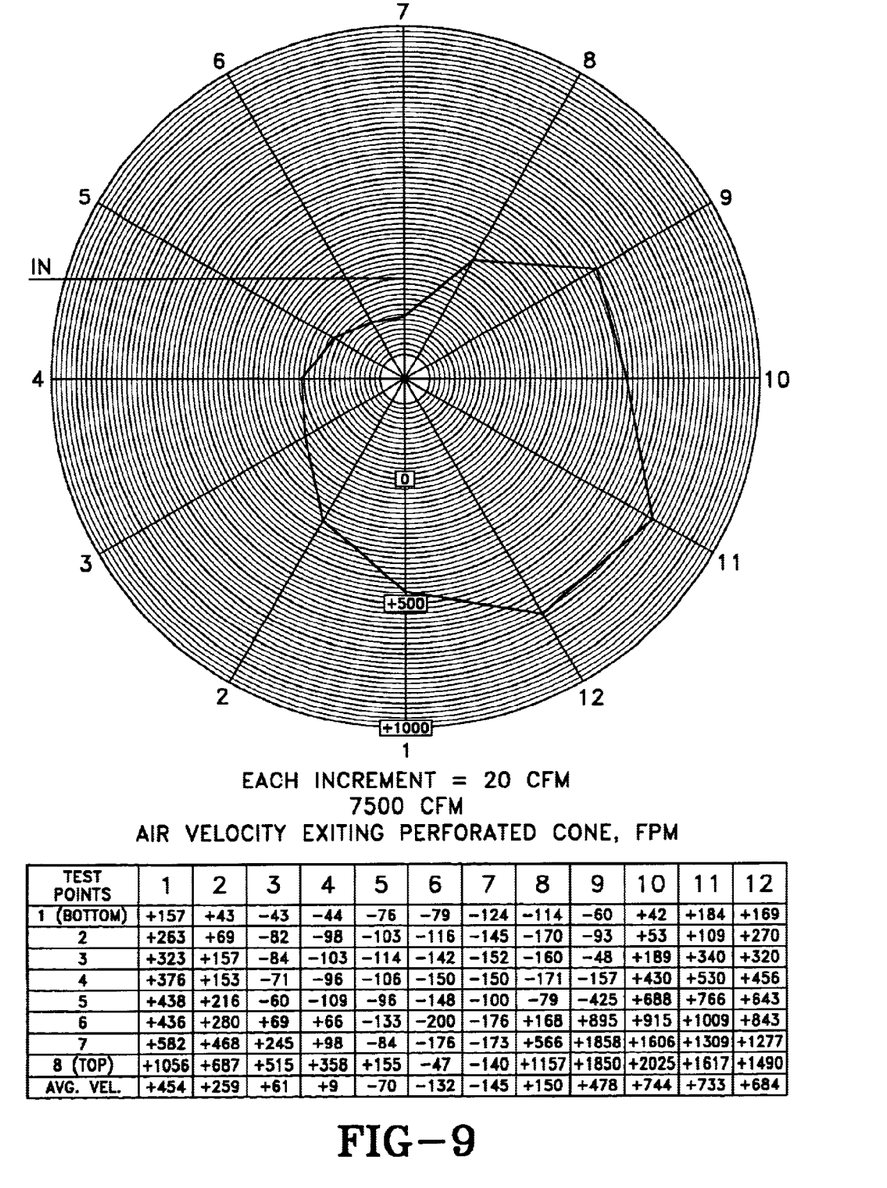
FIG. 9 is a graph showing the velocity of air exiting the outlet chamber at various points about a 7500 CFM air material separator.
Figure 10:
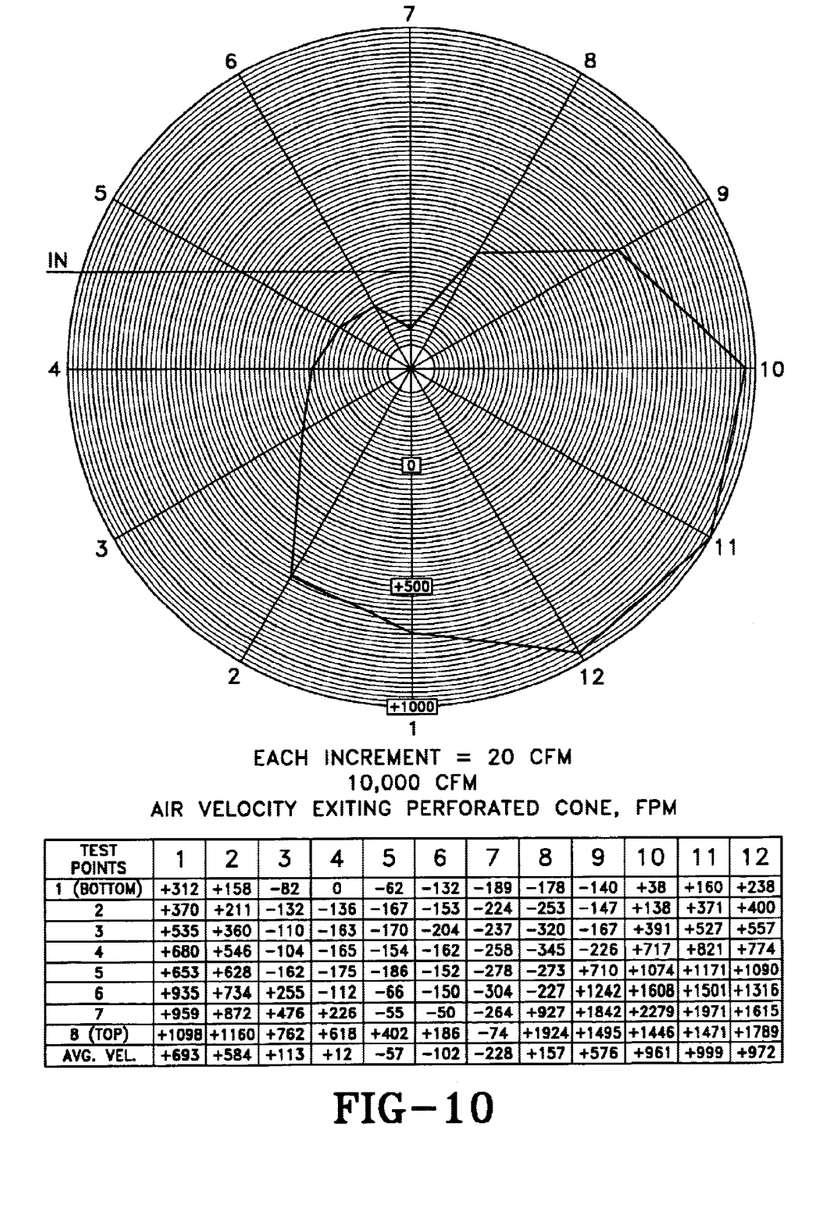
FIG. 10 is a graph showing the velocity of air exiting the outlet chamber at various points about a 10,000 CFM air material separator.

The movement of air and material through separator 10 is depicted schematically in FIGS. 6 and 7 with the air being represented by arrows 90 and scrap being represented by arrows 92. The scrap-laden air flow enters inlet 30 at an angle with respect to outer sidewall 50 as described above. This motion pushes some scrap toward outer sidewall 32 of inlet chamber 22. Upon entering inlet chamber 22, air 90 and scrap 92 immediately encounter spiral wall 40 and begin moving down into outlet chamber 24. The circular nature of inlet chamber 22 and spiral wall 40 immediately force a large amount of air and material against conical wall 70 immediately adjacent the end of spiral wall 40 (FIGS. 8–10). The velocity of the air flow passing through wall 70 reaches its maximum at the top of wall 70 one sixth of its circumference from the inlet. The velocity remain high through ⅓ of the circumference and then drops back to zero. The velocity actually becomes negative (back flow) over the last portion of the circumference. The velocity of the air passing through wall 70 is graphically depicted in FIGS. 8–10 for different separator configurations. For instance, in a 5,000 CFM unit, the average velocity of air 90 passing through wall 70 increases to approximately 380 feet per minute and remains at approximately this value about a third of the way around wall 70 before the velocity of air 90 passing through wall 70 begins to drop. Air material separator 10 functions differently than prior art devices because the air velocity does not have to be drastically decreased in order to drop the scrap out of the air flow. In the prior art devices, the air velocity was significantly slowed by expanding an air flow in order to drop scrap out of a device. In this device, the air speed remains high as the scrap is removed.

As air 90 passes through conical wall 70, scrap 92 drops down along conical wall 70 with a wiping action or falls through outlet chamber 24 until exiting outlet chamber 24 through scrap outlet 76. Essentially no air 90 passes through scrap outlet 76. When the top of inner wall 42 is open, very little air 90 moves up through wall 42.

Outlet chamber 24 resists clogging because air 90 and additional scrap 92 are constantly pushing down through outlet chamber 24.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An air material separator that separates scrap from a conveying air flow; the separator comprising:
    an outer sidewall defining an inlet chamber; the outer sidewall defining a first opening that receives the scrap and conveying air flow;
    the outer sidewall has an upper edge and a lower edge; the upper edge being spaced from the lower edge by the height of the outer sidewall;
    a spiral wall extending from the upper edge to the lower edge of the outer sidewall; the spiral wall contacting the upper edge of the outer sidewall adjacent the first opening;
    the spiral wall having an outer edge and an inner edge;
    an inner sidewall disposed radially inwardly of the outer sidewall; a flow path being defined intermediate the outer sidewall, the inner sidewall, and under the spiral wall such that the conveying airflow and scrap are directed through the flow path; the flow path having a length;
    a conical sidewall defining an outlet chamber; the outlet chamber being disposed under the inlet chamber and in fluid communication with the inlet chamber; substantially the entire length of the flow path being open to the outlet chamber; and
    the conical sidewall is perforated; the perforations defining an air outlet for the separator.

2. The separator of claim 1, wherein the separator is free of structures disposed between the inlet chamber and the outlet chamber.

3. The separator of claim 1, wherein the outer sidewall is cylindrical and has an inner surface whereby the scrap is forced against the inner surface of the cylindrical wall.

4. The separator of claim 3, wherein the inner sidewall is cylindrical.

5. The separator of claim 4, wherein the inner sidewall is concentric with the outer sidewall.

6. The separator of claim 1, further comprising a top wall connected to an upper edge of the outer sidewall and an upper edge of the inner sidewall; the spiral wall disposed intermediate the top wall and the lower edge of the outer sidewall.

7. The separator of claim 6, wherein the inner sidewall defines an inner space; the top wall does not cover the inner space disposed inside the inner sidewall such that the space provides a visual indicator of a scrap jam.

8. The separator of claim 1, further comprising an inlet disposed radially outside the outer sidewall.

9. The separator of claim 8, wherein the inlet includes an inlet outer sidewall, an inlet inner sidewall, an inlet top wall, and an inlet bottom wall; the inlet having a longitudinal axis.

10. The separator of claim 9, wherein the outer sidewall of the inlet is tangentially disposed with respect to the outer sidewall that defines the inlet chamber.

11. The separator of claim 10, wherein the inner sidewall of the inlet is substantially parallel to the outer sidewall of the inlet.

12. The separator of claim 11, wherein the top and bottom walls of the inlet are substantially parallel.

13. The separator of claim 10, further comprising a supply line connected to the inlet; the supply line having a longitudinal axis; the longitudinal axis of the supply line disposed at a first reference angle with respect to longitudinal axis of the inlet; the first reference angle being larger than zero degrees.

14. The separator of claim 1, wherein the spiral wall extends downwardly from the upper edge of the outer sidewall to the lower edge of the upper sidewall over at least a 270 degree arc.

15. The separator of claim 14 wherein the spiral wall extends downwardly from the upper edge of the outer sidewall to the lower edge of the upper sidewall over less than a 360 degree arc.

16. The separator of claim 1, wherein the conical sidewall that defines the outlet chamber has a lower edge; the lower edge defining a scrap outlet for the separator.

17. An air material separator that separates scrap from a conveying air flow; the separator comprising:
    an outer sidewall defining an inlet chamber; the outer sidewall defining a first opening that receives the scrap and conveying air flow;
    the outer sidewall has an upper edge and a lower edge; the upper edge being spaced from the lower edge by the height of the outer sidewall;
    a spiral wall extending from the upper edge to the lower edge of the outer sidewall; the spiral wall contacting the upper edge of the outer sidewall adjacent the first opening;

the spiral wall having an outer edge and an inner edge;

an inner sidewall disposed radially inwardly of the outer sidewall; a flow path being defined intermediate the outer sidewall, the inner sidewall, and under the spiral wall such that the conveying airflow and scrap are directed through the flow path; the flow path having a length;

a conical sidewall defining an outlet chamber; the outlet chamber being disposed under the inlet chamber and in fluid communication with the inlet chamber; substantially the entire length of the flow path being open to the outlet chamber;

the conical sidewall is perforated; the perforations defining an air outlet for the separator;

a top wall connected to an upper edge of the outer sidewall and an upper edge of the inner sidewall; the spiral wall disposed intermediate the top wall and the lower edge of the outer sidewall; and wherein the inner sidewall defines an inner space; the top wall covers the inner space disposed inside inner sidewall.

18. An air material separator that separates scrap from a conveying air flow; the separator comprising:

an outer sidewall defining an inlet chamber; the outer sidewall defining a first opening that receives the scrap and conveying air flow;

the outer sidewall has an upper edge and a lower edge; the upper edge being spaced from the lower edge by the height of the outer sidewall;

a spiral wall extending in a spiral from the upper edge to the lower edge; the spiral wall contacting the upper edge of the outer sidewall adjacent the first opening;

the spiral wall having an outer edge and an inner edge;

an inner sidewall disposed radially inwardly of the outer sidewall; a flow path being defined intermediate the outer sidewall, the inner sidewall, and the spiral wall such that the conveying airflow and scrap are directed through the flow path;

the inner sidewall defining an inner space;

a conical sidewall defining an outlet chamber; the outlet chamber in fluid communication with the inlet chamber;

the conical sidewall is perforated; the perforations defining an air outlet for the separator; the conical sidewall defining an opening for the scrap;

the separator being free of structures intermediate the inlet chamber and the outlet chamber;

an inlet disposed radially outside the outer sidewall; the inlet having a longitudinal axis; the inlet having an inlet outer sidewall disposed tangential to the outer sidewall that defines the inlet chamber; and a supply line connected to the inlet; the supply line having a longitudinal axis; the longitudinal axis of the supply line disposed at a first reference angle with respect to longitudinal axis of the inlet; the first reference angle being larger than zero degrees.

* * * * *